Patented Mar. 31, 1931

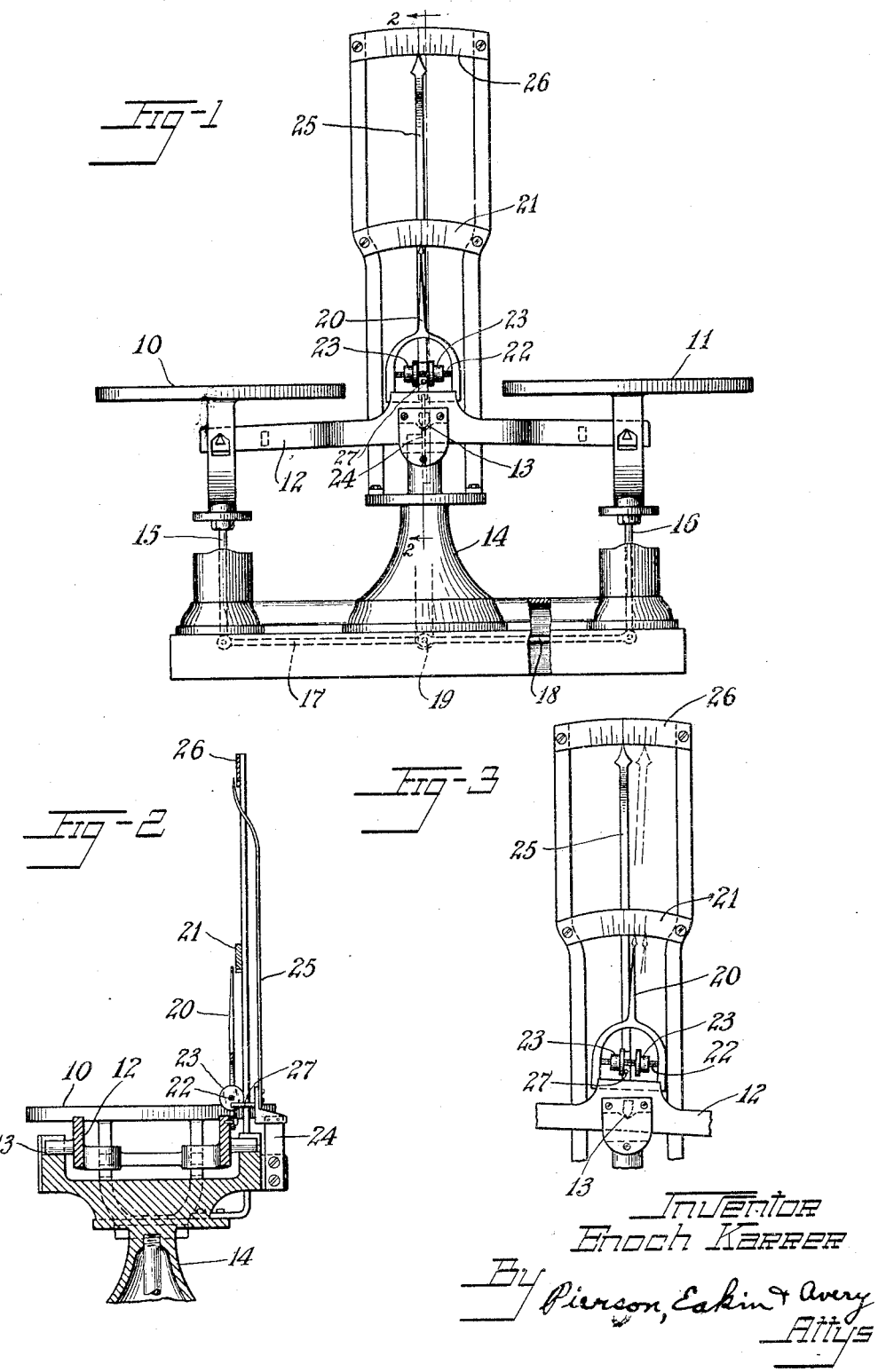

1,798,538

UNITED STATES PATENT OFFICE

ENOCH KARRER, OF CLEVELAND HEIGHTS, OHIO, ASSIGNOR TO THE B. F. GOODRICH COMPANY, OF NEW YORK, N. Y., A CORPORATION OF NEW YORK

WEIGHING DEVICE

Application filed June 9, 1927. Serial No. 197,572.

This invention relates to weighing devices and especially to devices in which provision is made for registering the amount by which the article weighed exceeds or is less than a standard weight.

My chief objects are to provide a convenient device of this character adapted to read directly in terms of over-weight and under-weight; to provide for readings of over-weight and of under-weight in terms of linear or volumetric measurement, so that the mass weighed readily may be brought to the standard weight, for example, as by removing from a mass of powdered or liquid material a suitable volumetric quantity thereof as indicated by the reading or removing from a piece of strip material such as a strip of rubber belting a suitable length thereof as indicated by an over-weight reading in linear units; and to provide for quickly and conveniently bringing a beam scale to balance for the ordinary weighing of articles or materials.

Of the accompanying drawings:

Fig. 1 is an elevation, with a part sectioned and broken away, of a weighing device embodying my invention in its preferred form.

Fig. 2 is a section of the same on line 2—2 of Fig. 1.

Fig. 3 is an elevation of a portion of the device illustrating a provision for certain tolerance in the recording of over-weight and under-weight readings.

Referring to the drawings, the embodiment of the invention here shown comprises a scale of the beam type having the usual scale pans 10 and 11 mounted in the usual manner on a balance beam 12 fulcrumed at 13 upon a standard 14, the scale pans being provided with downwardly extending stems 15, 16 having their lower ends connected by respective links 17, 18 with a stationary pivot 19 mounted directly under the fulcrum 13, to provide a parallel-motion for maintaining the scale pans in horizontal position as the balance beam 12 tilts upon its fulcrum 13.

Secured to the middle part of the balance beam 12 is an upwardly extending indicator 20 associated with a segmental scale dial 21 reading in units of weight.

The portion of the indicator 20 adjacent the balance beam 12 is formed as an arch which is spanned by a threaded bar 22 having mounted thereon a pair of spaced-apart flanged nuts 23, 23. Secured to a high part of the standard 14 is a vertical spring 24 having a long indicator 25 secured to its upper end in extension thereof, the indicator 25 being associated with a segmental scale dial 26 adapted to read in units of linear or volumetric measurement, as may be desired, in accordance with the specific gravity and cross-sectional area of strip material, for example, or in accordance with the specific gravity of a powdered or liquid material, to be weighed, the dial 26 being detachably mounted so that it readily may be removed for substitution by a different dial corresponding to a different substance or a different type of strip material to be weighed.

Adjacent the threaded bar 22 the indicator 25 is provided with an actuating stud 27 projecting from the indicator to a position between the flanged nuts 23, the construction being such that when a standard weight is placed upon the scale pan 10 or 11 and an article or a mass of material is placed upon the other scale pan and the under-weight or over-weight of the article or mass results in an unbalanced condition of the beam 12, the off-balance force will be sustained by the spring 24, through engagement of one or the other of the nuts 23 with the stud 27, and the deflection of the spring 24 by the off-balance force will be registered by the indicator 25 upon the scale dial 26.

The base of the spring 24 is preferably secured against flexure to a point a little below the fulcrum axis 13 of the scale beam 12, as will be seen clearly in Fig. 2, so that very little sliding movement of the stud 27 on the flanged nuts 23 will occur in the angular movement on the indicators. The nuts 23 may be so spaced apart as to permit a certain tolerance of under-weight or over-weight with respect to the movement of the indicator 25 from its middle position and the amount of such tolerance may be varied by changing the spacing of the nuts 23 upon the threaded bar 22.

In the operation of the device, assuming that it is desired to obtain a piece of strip material or a quantity of powdered material weighing 1 oz. for example, a standard 1 oz. weight is placed upon the scale pan 10 and a piece of the strip material or a quantity of the powdered material somewhat in excess of 1 oz. in weight is placed upon the scale pan 11. As this causes the scale beam to over-balance in the direction of the scale pan 11, the movement of the beam 12 beyond the horizontal position, subject to such tolerance as is permitted by the spacing of the nuts 23, is resisted by the spring 24 and consequently expresses itself in deflection of the spring, which deflection is registered by the indicator 25 upon the scale dial 26.

The operator is then able instantly to determine the excess of material in terms of weight by reading the scale 21, if desired, and also instantly to determine the excess of material in terms of linear or volumetric measurement, as the case may be, by a reading of the scale dial 26. In the case of a sample or test piece of belting, for example, the indicator 25 may give a reading upon the dial 26 corresponding to the weight of a section of the belting 3/4" in length, in which case the operator is informed that by cutting a piece 3/4" long from the specimen being weighed the sample piece will be brought to the desired weight.

Similarly in the case of powdered or liquid material the operator may be informed by a reading of the dial 26 as to what volume of the material it is necessary to remove in order to bring the scale beam 12 to balance.

In weighing a mass consisting of a number of articles all of substantially equal weight as in the case of weighing candies, the dial 26 may be omitted, and, the approximate weight of each piece or article being known, the dial 21 alone, reading in units of weight, will enable the operator to bring the scale beam 12 quickly to balance by removing such number of articles as correspond to the registered amount of over-weight.

It will be obvious that negative readings upon the dials 26 and 21 will result when the material or the thing weighed is of less than the standard weight and that the reading of the dial 26 or of the dial 21 will facilitate the matter of making proper additions to balance the scale.

The invention is susceptible of modification as to the type of scale employed and as to the construction and arrangement of parts, and I do not desire to limit my claims except as may be required by the prior art.

I claim:

1. A weighing device comprising an indicator responsive to the weight of the thing weighed and a scale dial associated with said indicator and graduated to read in units of measurement of a dimensional characteristic having reference to a weight characteristic of the material weighed, the scale dial being graduated from a base mark representing a standard weight value.

2. A weighing device comprising an indicator responsive to the weight of the thing weighed and a scale dial associated with said indicator, the said dial having a base mark representing a standard-weight value and being graduated in both directions from said base mark in units of measurement of a characteristic other than that of weight but having reference to a weight characteristic of the thing weighed.

3. A weighing device comprising a balance beam, an indicator and a scale dial for registering movement of said beam, the dial being graduated from a base mark representing balance of the beam, the said beam being of the horizontally-balancing type, and yielding means for resisting movement of the beam from the position of balance, the graduations of the dial being correlated to the force of the said yielding means and reading in units of measurement of a dimensional characteristic having reference to a weight characteristic of the thing weighed.

4. A weighing device as defined in claim 3 in which a tolerance is provided between the beam's position of balance and the position at which it begins to be opposed by the yielding means defined.

5. A weighing device comprising a balance beam, an indicator and a scale dial for registering movement of said beam, the dial being graduated from a base mark representing balance of the beam, and yielding means for resisting movement of the beam from the position of balance, the graduations of the dial being correlated to the force of the said yielding means and graduated to read in units of quantity other than units of weight but having reference to a weight characteristic of the thing weighed.

In witness whereof I have hereunto set my hand this 3rd day of June, 1927.

ENOCH KARRER.